United States Patent
Dötsch et al.

(10) Patent No.: US 6,882,633 B2
(45) Date of Patent: Apr. 19, 2005

(54) METHOD AND DEVICE FOR SYNCHRONIZING A MOBILE RADIO RECEIVER WITH A FRAME STRUCTURE OF A RADIO SIGNAL

(75) Inventors: Markus Dötsch, Schliern (CH); Tideya Kella, München (DE); Peter Schmidt, Erpolzheim (DE); Peter Jung, Otterberg (DE); Jörg Plechinger, München (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 383 days.

(21) Appl. No.: 09/978,397

(22) Filed: Oct. 16, 2001

(65) Prior Publication Data

US 2002/0114298 A1 Aug. 22, 2002

Related U.S. Application Data

(63) Continuation of application No. PCT/DE00/01176, filed on Apr. 14, 2000.

(30) Foreign Application Priority Data

Apr. 16, 1999  (DE) ......................................... 199 17 337

(51) Int. Cl.[7] .............................. H04B 7/216; H04J 3/06
(52) U.S. Cl. ...................................... 370/335; 370/509
(58) Field of Search ................................ 370/335, 342, 370/350, 503, 509, 512–515, 310, 328, 389, 479; 375/145, 229, 354, 356, 366–368

(56) References Cited

U.S. PATENT DOCUMENTS

| | | | | |
|---|---|---|---|---|
| 5,293,380 A | * | 3/1994 | Kondo | 370/337 |
| 5,293,423 A | * | 3/1994 | Dahlin et al. | 380/272 |
| 5,608,765 A | * | 3/1997 | Tanoue | 375/365 |
| 5,930,366 A | * | 7/1999 | Jamal et al. | 370/509 |
| 5,978,367 A | * | 11/1999 | Kinnunen et al. | 370/337 |
| 6,014,376 A | * | 1/2000 | Abreu et al. | 370/350 |
| 6,539,032 B1 | * | 3/2003 | Rudolf | 370/503 |
| 6,567,482 B1 | * | 5/2003 | Popovic' | 375/343 |

FOREIGN PATENT DOCUMENTS

| | | |
|---|---|---|
| WO | WO 99/00912 | 1/1999 |
| WO | WO 99/12273 | 3/1999 |

* cited by examiner

*Primary Examiner*—Chau Nguyen
*Assistant Examiner*—Andy Lee
(74) *Attorney, Agent, or Firm*—Laurence A. Greenberg; Werner H. Stemer; Gregory L. Mayback

(57) ABSTRACT

A method for synchronizing a mobile radio receiver with a frame structure of a radio signal received from a specific base station assumes that each base station transmits a predefined, individual sequence of frame synchronization codes for each frame. The synchronization codes are detected and decoded in the mobile radio receiver and a characteristic code parameter is allocated to them. The sequence transmitted by the specific base station is identified on the basis of the code parameters and the start and end times of the sequence are defined. The mobile radio receiver is frame-synchronized with these times.

7 Claims, 3 Drawing Sheets

METHOD AND DEVICE FOR SYNCHRONIZING A MOBILE RADIO RECEIVER WITH A FRAME STRUCTURE OF A RADIO SIGNAL

CROSS-REFERENCE TO RELATED APPLICATION

This application is a continuation of copending International Application No. PCT/DE00/01176, filed Apr. 14, 2000, which designated the United States.

BACKGROUND OF THE INVENTION

Field of the Invention

The invention relates to a method for synchronizing a mobile radio receiver with a frame structure of a radio signal received from one specific base station of a plurality of base stations, and a frame synchronization device for a mobile radio receiver.

Temporal synchronization between the base station and the mobile station is required in order to operate a mobile radio system. Two forms of synchronism are distinguished here: frequency synchronism and frame synchronism. The invention relates exclusively to frame synchronism. Frame synchronization is carried out on the uplink, i.e. from the base station (transmitter) to the mobile station (receiver). Frame synchronism means that the mobile station detects (i.e. temporally correctly records) a frame structure (specified in the base station by a data-structuring rule) of the transmitted data stream in the received radio signal, whereby both frame-related processing of the received data symbols and temporally correct (i.e. synchronized with the base station) frame formation of the radio signals to be transmitted are enabled in the mobile station.

It is already known from the book entitled "Analyse und Entwurf digitaler Mobilfunksysteme" ["Analysis and Design of Digital Mobile Radio Systems"], by P. Jung, Stuttgart, B. G. Teubner, 1997: pages 236–237, for frame synchronization of the mobile stations to be carried out by "synchronization bursts", which are repeatedly transmitted by the base stations at regular intervals.

In code division multiple access (CDMA) systems, it is proposed, in order to achieve frame synchronism, to use a synchronization channel that is jointly used by all base stations. During each frame of a user data signal, each base station continually and repeatedly transmits precisely one sequence which is characteristic of the base station, containing a predefined number N of frame synchronization codes into the synchronization channel. The frame time period which is identical for all base stations and the different sequences transmitted by the various base stations are known to the mobile station. The mobile station records the timing of the user data signal frames transmitted by a specific base station by correlating the frame synchronization codes detected over a frame time period from any given start time onwards with all known sequences and with all N cyclical shifts thereof, and subsequently by determining the (if necessary, cyclically shifted) sequence with maximum correlation. The detected sequence with maximum correlation, on the one hand, identifies the specific base station and, on the other hand, enables frame synchronization in the mobile station.

Methods for synchronizing mobile radio receivers with a frame structure of a radio signal received from one of a specific plurality of base stations are described in International Patent Disclosures WO 99 12273 A and WO 99 00912 A, the methods essentially operate according to the aforementioned principles. The first-named of these two documents discloses a synchronization device for this purpose, with an equalizer and a decoder by which the frame synchronization codes transmitted by the specific base stations are detected and decoded in the mobile radio receiver, a computing unit to carry out calculations on the frame synchronization codes and a frame timing alignment device for synchronizing the mobile radio receiver using the sequence of frame synchronization codes with the frame structure of the radio signal received from a base station.

A disadvantage of this method is the high computing outlay. In the case of R base stations (i.e. R different sequences), RN correlation calculations and a maximum search must be carried out in order to identify a specific base station.

SUMMARY OF THE INVENTION

It is accordingly an object of the invention to provide a method and a device for synchronizing a mobile radio receiver with a frame structure of a radio signal that overcomes the above-mentioned disadvantages of the prior art methods and devices of this general type, which require a low-outlay for the frame synchronization of the mobile station with the base station.

With the foregoing and other objects in view there is provided, in accordance with the invention, a method for synchronizing a mobile radio receiver with a frame structure of a radio signal received from one specific base station of a plurality of base stations. The method includes transmitting, from each of the base stations, a predefined sequence for each frame, and the predefined sequence has N frame synchronization codes. In each case two predefined sequences transmitted by different ones of the base stations differ from one another in terms of at least one frame synchronization code. The frame synchronization codes, transmitted by the specific base station, are detected and decoded in the mobile radio receiver resulting in detected and decoded frame synchronization codes. A code parameter is allocated to each of the detected and decoded frame synchronization codes, the code parameter characterizes each of the detected and decoded frame synchronization codes. The predefined sequence transmitted by the specific base station is identified on a basis of N consecutively received code parameters, resulting in an identified sequence. The mobile radio receiver is synchronized with the frame structure of the radio signal received from the specific base station using the identified sequence containing the frame synchronization codes. A timing of the frame structure used in the mobile radio receiver is aligned with a start time and an end time of the identified sequence.

Through the allocation of a code parameter to each detected frame synchronization code, simple identification of the sequence transmitted by the specific base station is enabled on the basis of the N determined code parameters.

A computing-intensive correlation analysis over the period of one frame is thus not necessary, so that a comparatively low computing outlay is required.

The term "different sequence pairs" means that every two sequences (originating from different base stations) differ from one another in terms of at least one frame synchronization code (taking into account the sequential order thereof).

An advantageous embodiment of the method according to the invention is characterized in that the set of the frame synchronization codes contained in the sequences differ in pairs, that, in order to identify the sequence transmitted by the specific base station, a function which is invariant compared with a cyclical shift of the detected frame synchronization codes is used, and that the function is applied to the N received code parameters and the received function value identifies the sequence transmitted by the specific base station.

The specific base station is preferably determined according to the function $$F(c1, \ldots, cN) = \sum_{n=1}^{N} (K(cn))^p,$$

where p is a natural number where p>0, in particular p>1, and K(c1), ..., K(cN) are the determined parameters. On the basis of the invariance of the functions compared with a cyclical shift of the detected frame synchronization codes, it is irrelevant which of the frame synchronization codes of the sequence is detected as (temporally) the first of the N codes.

In accordance with an added mode of the invention, the synchronizing step includes defining at least one reference frame synchronization code of the identified sequence with a known temporal spacing from a frame start; and synchronizing the mobile radio receiver with the reference frame synchronization code.

In accordance with another mode of the invention, there is the step of using orthogonal gold codes as the frame synchronization codes.

With the foregoing and other objects in view there is provided, in accordance with the invention, a combination of a mobile radio receiver and a device for synchronizing the mobile radio receiver with a frame structure of a radio signal received from one specific base station of a plurality of base stations. Each of the base stations transmits a predefined sequence for each frame and the predefined sequence contains N frame synchronization codes. The device contains a decector and a decoder used for detecting and decoding the frame synchronization codes transmitted by the specific base station in the mobile radio receiver. A computing unit is provided for performing calculations on the frame synchronization codes. A frame timing alignment device is provided for synchronizing the mobile radio receiver using the predefined sequence of the frame synchronization codes. In each case two predefined sequences transmitted by different ones of the base stations differ from another in terms of at least one frame synchronization code. An allocation logic allocates a code parameter, characteristic of the frame synchronization code, to each detected and decoded frame synchronization code resulting in N consecutively received code parameters. The computing unit identifies the predefined sequence transmitted by the specific base station on a basis of a calculation performed on the N consecutively received code parameters, resulting in an identified sequence. The frame timing alignment device synchronizes the mobile radio receiver using the identified sequence of the frame synchronization codes with the frame structure of the radio signal received from the specific base station by aligning a timing of the frame structure used in the mobile radio receiver with a start time and an end time of the identified sequence.

Other features which are considered as characteristic for the invention are set forth in the appended claims.

Although the invention is illustrated and described herein as embodied in a method and a device for synchronizing a mobile radio receiver with a frame structure of a radio signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
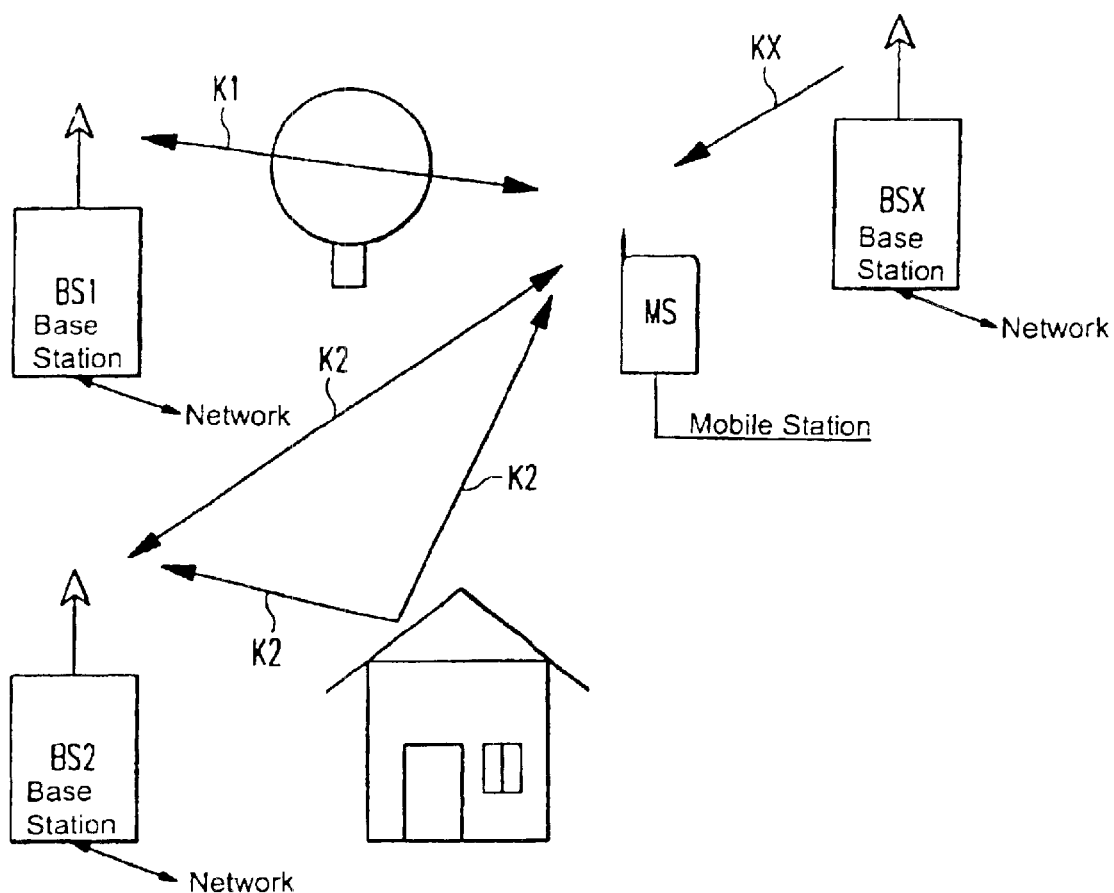
FIG. 1 is a schematic representation of a general air interface of a mobile radio system with a mobile station and a plurality of base stations.

Referring now to the figures of the drawing in detail and first, particularly, to FIG. 1 thereof, there is shown a schematic representation of an air interface of a cellular mobile radio system. A mobile station MS allocated to an individual subscriber is located in a radio range of a plurality of base stations BS1, BS2, ..., BSX, ..., which are connected to a common telecommunications network. The communications connections K1, K2, ..., KX, ..., between the base stations BS1, BS2, ..., BSX, ..., and the mobile station MS are subjected to multipath propagation.

Each of the base stations BS1, BS2, ..., BSX, ..., has a radio link to a multiplicity of further non-illustrated mobile stations. Radio signals F of all base stations transmitted via communications connections K1, K2, ..., KX, ..., have a uniform, i.e. structurally identical, frame structure.

Figure 2:
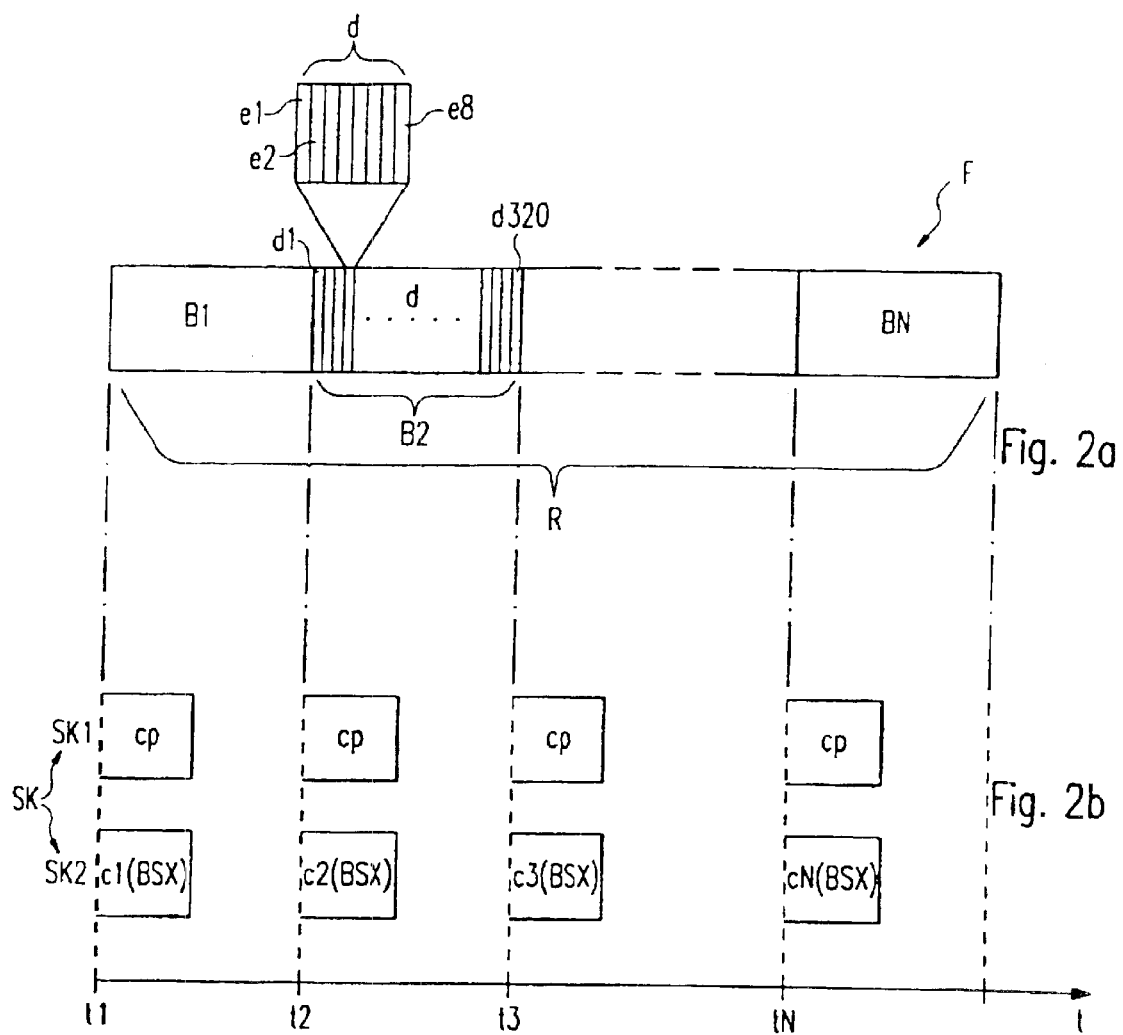
FIG. 2a is a schematic representation of a data structure of a frame used in the mobile radio system according to the invention.
FIG. 2b is a schematic representation of a synchronization channel, in which an arrival of first synchronization codes and the arrival of second frame synchronization codes of a radio signal of a specific base station at the location of a mobile station which is to be synchronized are plotted over time.

FIG. 2a shows an example of such a frame structure of the radio signal F.

The radio signal F contains a sequence of individual data symbols (bits) d. A data block B1; B2; ...; BN is formed from a system-standard-specific number of data symbols d (here, for example, 320 data symbols). A frame R is built from a system-standard-specific number N of data blocks B1, B2, ..., BN. The frame R may, for example, be built from N=16 data blocks B1, B2, ..., B16 and, in the present example, then contains 5120 data symbols d.

The example shown in FIG. 2a is based on a CDMA radio signal F. Therefore, each data symbol d is spread-coded with a subscriber-specific spread code (CDMA code). The spread code contains, for example, 8 chips (slots) e1, e2, ..., e8 per data symbol d.

The entire frame/block/data/chip structure of the radio signal F shown in FIG. 2a and the corresponding frame/block/data/chip durations are defined in a system-specific manner and are identical for the transmitted radio signals F of all base stations BSi, i=1, 2, ...

If, in connection with a call acceptance or handover, a two-way communications link KX is intended to he set up between the mobile station MS and a specific base station BSX (normally the base station with the highest receiver signal strength at the mobile station MS), the mobile station MS must first be synchronized with the frame structure of the radio signal F received from the specific base station BSX, i.e. the mobile station MS must be able to detect the start and end of a received frame R.

A synchronization channel SK common to all base stations BSi is used to achieve frame synchronism of this type (see FIG. 2b). The synchronization channel SK is divided into two channels SK1 and SK2.

In the first channel SK1, each base station BSi transmits a first synchronization code cp at regular time intervals—for example, at the start of each data block B1, B2, . . . , BN. The first synchronization code cp is identical for all blocks B1, B2, . . . , BN and all base stations BSi. The first synchronization codes cp transmitted by the specific base station BSX serve to provide all mobile stations MS which are "ready for synchronization" with a clock frequency standard which enables them temporally correctly to detect second frame synchronization codes which are furthermore transmitted by the (specific) base station BSX, and which are explained in more detail below.

Since the system-specific block duration is known to each mobile station MS, it can then also record the clock of the specific base station BSX if further first synchronization codes cp from different base stations BSi occur in the first channel SK1.

However, since the first synchronization code cp, as already mentioned, is identical for all base stations BSi, it does not allow the identification of the base station that transmitted it.

Identification of a base station BSi and the frame synchronization with the latter are achieved via the second channel SK2. In the second channel, each base station BSi transmits a sequence FBSi=(c1(BSi), c2(BSi), . . . , cN(BSi)), which recurs identically in each frame R, containing N frame synchronization codes (c1(BSi); c2(BSi); . . . ; cN(BSi).

The individual frame synchronization codes (c1(BSi); c2(BSi); . . . ; cN(BSi) of each sequence FBSi originate from a basic set of K-elements M=(c1, c2, . . . , cK) of frame synchronization codes c1, c2, . . . , cK which differ in pairs, the set being predefined in a system-standard-specific manner and its elements (the individual frame synchronization codes) being known both in the base stations BSi and in the mobile stations MS.

The frame synchronization codes c1, c2, . . . , cK contained in the basic set M may, for example, be orthogonal, unmodulated gold codes with a length of, for example, 256 chips (slots).

The sequence FBSi transmitted by each base station BSi is specific to the transmitting base station BSi, i.e. it differs from all other sequences FBSj of the remaining base stations BSj, j=1, 2, . . . ; j≠i, in at least one element in each case (frame synchronization code).

The basis for the difference between two sequences FBSi, FBSj may be that the two sequences contain different elements, i.e. the one sequence contains at least one frame synchronization any code that the other does not contain. Otherwise, the two sequences FBSi, FBSj contain the same elements. Since the same frame synchronization code c1; c2; . . . ; cK may occur several times in one sequence, sequences FBSi, FBSj containing the same elements may also differ (in terms of a different number of identical frame synchronization codes). A third option is that two sequences FBSi, FBSj differ only in terms of a different frame synchronization code sequence.

In the first two cases (sequences containing different elements; sequences containing the same elements with different frequency of identical frame synchronization codes) the N-element sets {c1(BSi), . . . , cN(BSi)} and {c1(BSj), . . . , cN(BSj)} of the frame synchronization codes respectively contained in the sequences FBSi, FBSj are different.

It is evident that K may be less than, equal to or greater than N.

The frame synchronization of the mobile station MS with the specific base station BSX will now be described with reference to FIG. 2b. The first synchronization codes cp (from the base station BSX) shown in the first synchronization channel SK1 over time t are received in the mobile station MS at times t1, t2, . . . , tN. In order to locate a frame start, the specific base station (i.e. BSX) transmitting the first synchronization codes must first be identified in the mobile station MS. To do this, starting at any given start clock time (t1 or t2 or . . . or tN), N consecutive frame synchronization codes c1, c2, cN, in each case arriving simultaneously with first synchronization codes cp, are detected and decoded.

The detection/decoding is carried out by an adaptive equalizer for reconstruction of the originally transmitted chips and a decoder for decoding the individual frame synchronization codes c1, c2, . . . , cN.

A code-specific parameter (code parameter) K(cn), n=1, 2, . . . , N is then allocated to each detected frame synchronization code c1, c2, . . . , cN. The allocated code parameter K(cn) may, for example, be identical to the (randomly assignable) index n of a frame synchronization code cn of the basic set or quantity M, i.e. K(cn)=n.

The identity of the specific base station BSX is then determined solely using the N determined code parameters K(c1) , K(c2) , . . . , K(cN).

For this purpose, a function which is invariant compared with cyclical shifts of the determined code parameters K(c1), K(c2), . . . , K(cN), for example $$F(c1, \ldots, cN) = \sum_{n+1}^{N} (K(cn))^p$$

where, e.g. p=2, is used. The following applies on the basis of the invariance compared with cyclical shifts of the determined code parameters:

F(c1, . . . , cN)=F(FBSX).

The sequences FBSi of the base stations BSi and the allocation rule K(cn) are to be selected in such a way that the function values F(FBSi) are different for all sequences FBSi. In this case, the function value F(FBSi) uniquely designates the associated base station BSi, i.e. it identifies the latter.

In the case shown in FIG. 2b, a function value F(FBSX) is therefore obtained which uniquely indicates that the first and second synchronization codes cp and cn(BSX) originate from the base station BSX.

The synchronization of the mobile station MS with the specific base station BSX is then effected in that the timing of the frame structure used internally in the mobile station MS (to receive and/or transmit a user data signal) is aligned with a start time (t1) and an end time (tn) of the detected sequence FBSX. For this purpose, for example, the first frame synchronization code c1 (BSX) located at the frame start t1 of the detected sequence FBSX must be known in the mobile station MS and must be unique in the sequence FBSX. The use of one or more different unique reference frame synchronization codes cn(BSX) in the sequence FBSX with a known temporal spacing tn–t1 from the frame start is of course equally possible.

The method according to the invention has been explained according to FIGS. 2a and 2b using an example in which the number N of blocks in a frame coincides with the number N of frame synchronization codes cn(BSi) of a sequence FBSi. However, this is in no way essential for the present invention.

Furthermore, it must be noted that the method according to the invention has been explained with reference to a direct sequencing (DS) CDMA radio or user data signal (see FIG. 2a), but it is obvious that it can also be used for other known CDMA methods, for example, frequency hopping (FH) CDMA or multicarrier code (MC) CDMA, and generally in other multiple access methods (TDMA, FDMA) also.

To implement the method according to the invention in a mobile radio receiver, the latter is equipped with (normally software-implemented) allocation logic which performs the task of allocating the code parameters $K(c1), \ldots, K(cN)$ to the individual detected and decoded frame synchronization codes $c1, \ldots, cN$. A computing unit performs the calculation of the function value of the function F, the value identifying the received sequence FBSX and therefore the base station BSX. The frame synchronization of the mobile radio receiver is then carried out by a frame timing alignment device using one or more characteristic times (for example the start and/or end time) of the identified frame.

Figure 3:
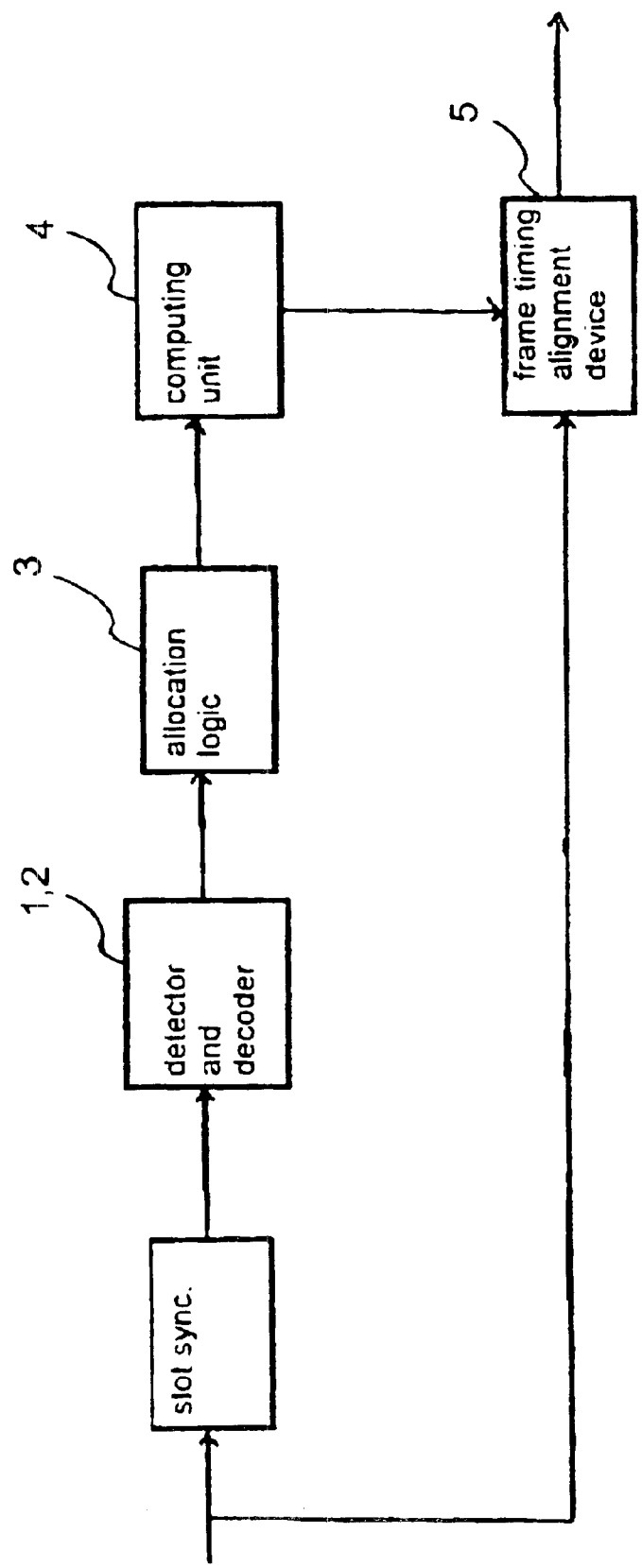
FIG. 3 is block diagram showing the device for synchronizing the mobile radio receiver with a frame structure of a radio signal according to the invention.

FIG. 3 shows the device for synchronizing the mobile radio receiver with a frame structure of a radio signal according to the invention.

As shown in FIG. 3, the device for synchronizing the mobile radio receiver with a frame structure of a radio signal according to the invention contains a detector 1 and a decoder 2 for detecting and decoding the frame synchronization codes transmitted by the specific base station in the mobile radio receiver. An allocation logic 3 allocates a code parameter, characteristic of the frame synchronization code, to each detected and decoded frame synchronization code resulting in N consecutively received code parameters. A computing unit 4 is provided for performing calculations on the frame synchronization codes. The computing unit 4 identifies the predefined sequence transmitted by the specific base station on a basis of a calculation performed on the N consecutively received code parameters, resulting in an identified sequence. A frame timing alignment device 5 is provided for synchronizing the mobile radio receiver using the predefined sequence of the frame synchronization codes. In each case two predefined sequences transmitted by different ones of the base stations differ from another in terms of at least one frame synchronization code. The frame timing alignment device 5 synchronizes the mobile radio receiver using the identified sequence of the frame synchronization codes with the frame structure of the radio signal received from the specific base station by aligning a timing of the frame structure used in the mobile radio receiver with a start time and an end time of the identified sequence.

We claim:

1. A method for synchronizing a mobile radio receiver with a frame structure of a radio signal received from one specific base station of a plurality of base stations, the method comprises the steps of:

transmitting, from each of the base stations, a predefined sequence for each frame, the predefined sequence having N frame synchronization codes selected from a set of synchronization codes, and in each case two predefined sequences transmitted by different ones of the base stations differ from one another in terms of at least one frame synchronization code;

detecting and decoding the frame synchronization codes, transmitted by the specific base station, in the mobile radio receiver, the synchronization codes of the set of synchronization codes being known in the mobile radio receiver, resulting in detected and decoded frame synchronization codes;

allocating a code parameter, to each of the detected and decoded frame synchronization codes, the code parameter characterizing each of the detected and decoded frame synchronization codes;

identifying the predefined sequence transmitted by the specific base station on a basis of N consecutively received code parameters, resulting in an identified sequence; and synchronizing the mobile radio receiver with the frame structure of the radio signal received from the specific base station by aligning a timing of the frame structure used in the mobile radio receiver with a characteristic time of the identified sequence.

2. The method according to claim 1, which comprises:

forming sets of the frame synchronization codes contained in the predefined sequences to differ in pairs;

using a function which is invariant compared with a cyclical shift of detected frame synchronization codes for identifying the predefined sequence transmitted by the specific base station; and applying the function to the N consecutively received code parameters and a derived function value identifies the predefined sequence transmitted by the specific base station.

3. The method according to claim 2, which comprises setting the function such that $$F(c1, \ldots, cN) = \sum_{n=1}^{N} (K(cn))^p$$

where p is a natural number where p>0, and $K(c1), \ldots, K(cN)$ are the code parameters determined.

4. The method according to claim 1, wherein the synchronizing step comprises the steps of:

defining at least one reference frame synchronization code of the identified sequence with a known temporal spacing from a frame start; and synchronizing the mobile radio receiver with the reference frame synchronization code.

5. The method according to claim 1, which comprises using orthogonal gold codes as the frame synchronization codes.

6. The method according to claim 3, which comprises setting p>1.

7. In combination with a mobile radio receiver, a device for synchronizing the mobile radio receiver with a frame structure of a radio signal received from one specific base station of a plurality of base stations, each of the base stations transmits a predefined sequence for each frame and the predefined sequence contains N frame synchronization codes selected from a set of synchronization codes, the device comprising:

a detector;

a decoder, said detector and said decoder used for detecting and decoding the frame synchronization codes transmitted by the specific base station in the mobile radio receiver, the synchronization codes of the set of synchronization codes being known in the mobile radio receiver;

a computing unit for performing calculations on the frame synchronization codes;

a frame timing alignment device for synchronizing the mobile radio receiver using the predefined sequence of the frame synchronization codes, in each case two predefined sequences transmitted by different ones of the base stations differ from another in terms of at least one frame synchronization code; and an allocation logic allocates a code parameter, characteristic of the frame synchronization code, to each detected and decoded frame synchronization code resulting in N consecutively received code parameters;

said computing unit identifies the predefined sequence transmitted by the specific base station on a basis of a calculation performed on the H consecutively received code parameters, resulting in an identified sequence;

said frame timing alignment device synchronizes the mobile radio receiver using the identified sequence of the frame synchronization codes with the frame structure of the radio signal received from the specific base station by aligning a timing of the frame structure used in the mobile radio receiver with a characteristic time of the identified sequence.

* * * * *